US005851583A

United States Patent [19]

Kronenwetter

[11] Patent Number: 5,851,583

[45] Date of Patent: Dec. 22, 1998

[54] METHOD OF BLENDING PAINT AND SPOT PAINTING

[75] Inventor: Thomas J. Kronenwetter, Myrtle Beach, S.C.

[73] Assignee: Total Car Franchising Corporation Colors on Parade, Conway, S.C.

[21] Appl. No.: 761,570

[22] Filed: Dec. 6, 1996

Related U.S. Application Data

[60] Provisional application No. 60/008,380 Dec. 8, 1995.

[51] Int. Cl.[6] .............................. B32B 35/00; B05D 1/02

[52] U.S. Cl. ........................... 427/140; 427/10; 427/142; 427/336; 427/421

[58] Field of Search .................................... 427/140, 142, 427/336, 407.1, 10, 421

[56] References Cited

U.S. PATENT DOCUMENTS

| | | | |
|---|---|---|---|
| 1,485,521 | 3/1924 | Nikolas | 427/336 |
| 2,390,758 | 12/1945 | Wahlberg | 427/336 |
| 3,420,692 | 1/1969 | Jeff et al. | 427/336 |
| 3,519,360 | 7/1970 | Kudlek | 356/244 |
| 3,930,069 | 12/1975 | Stephens | 427/142 |
| 4,265,936 | 5/1981 | Prohaska, Jr. | 427/140 |
| 4,273,808 | 6/1981 | Neirynck et al. | 427/142 |
| 4,341,821 | 7/1982 | Toda et al. | 427/336 |
| 4,403,866 | 9/1983 | Falcoff et al. | 366/136 |
| 4,598,015 | 7/1986 | Panush | 427/409 |
| 4,668,570 | 5/1987 | Esselborn et al. | 427/409 |
| 4,692,481 | 9/1987 | Kelly | 523/219 |
| 4,814,200 | 3/1989 | Propst | 427/142 |
| 5,077,086 | 12/1991 | Cavill | 427/277 |
| 5,128,176 | 7/1992 | Schmidt. | 427/142 |
| 5,217,377 | 6/1993 | Little, Jr. | 434/103 |
| 5,252,192 | 10/1993 | Speakman | 156/94 |
| 5,279,862 | 1/1994 | Corcoran et al. | 427/407.1 |

OTHER PUBLICATIONS

English abstract of West German Patent Document DT 25 23 0001 A1, Dec. 1975.

Abstract of Japanese patent document 51 4231, Jan. 1976.

Abstract of Japanese patent document 52 29778, Aug. 1977.

Abstract of Japanese patent document JO 1245–882–A, Oct. 1989.

*Primary Examiner*—Diana Dudash
*Attorney, Agent, or Firm*—Michael F. Labbee; Kilpatrick Stockton LLP

[57] ABSTRACT

A process for blending paint to match an existing finish. A first color imparting component is first provided, in an amount proportionate to a paint formulation, and mixed with a base coat reducer to obtain a first reduced component. A second color imparting component is also provided, in an amount proportionate to the amount of the first color imparting component according to the paint formulation, and mixed with a base coat reducer to obtain a second reduced component. A portion of the first reduced component is then mixed with a portion of the second reduced component to obtain a base paint. The base paint is tested by applying the base paint onto a surface and allowing it to dry to obtain a painted surface, and comparing the painted surface with an existing finish after simulating a clear coat finish with a lustrous liquid. If the painted surface does not adequately match the existing finish, a further portion of either the first reduced component or second reduced component is added to the base paint which is again tested as described. The process is repeated until a suitable base pant is obtained.

10 Claims, No Drawings

METHOD OF BLENDING PAINT AND SPOT PAINTING

RELATED APPLICATIONS

This application claims priority to U.S. Ser. No. 60/008,380, filed Dec. 8, 1995, for "Method of Blending Paint and Spot Painting" (the disclosure from which being hereby incorporated by reference).

1. Field of the Invention

This invention relates to painting, and to methods of blending paints which, when applied to a surface having an existing painted finish, closely match the color of the existing finish. The invention also relates to the repair or restoration of damaged paint finishes that comprise two distinct coats: a base coat that imparts color to the finish, and a clear coat applied atop the base coat that imparts gloss and durability to the finish.

2. Background of the Invention

The visible and exposed surfaces of vehicles such as automobiles, trucks, boats and motorcycles are often painted using a two coat painting method in which a pigmented base coat is applied to a primed surface to color the surface. After the base coat has dried it is coated with a glossy clear coat that is durable and resists scratches to the vehicle's finish. Despite the durability of these two coat finishes, they are often damaged by scratches, exposure to road treatments such as sand or salt, chipping due to gravel or particles kicked up from the road surface, or indentations resulting from contact with other vehicles or objects.

In conventional methods for repairing damage to vehicle paint finishes the entire piece having a damaged area, such as the panel, door, or fender of an automobile, is completely repainted. Even though the damaged area may be only a small fraction of the area of the piece, the entire piece is often repainted because of the difficulty, time, and expense involved in obtaining a finished surface that suitably matches the finish of the piece surrounding the damaged area. Although one can readily ascertain the formulation of a vehicle's original base coat paint through manufacturers' disclosures, such information may not be sufficient when the precise ingredients are no longer available, or when the color of the base coat has faded from the sun's ultraviolet rays and thus no longer matches the original color or tint of the base coat. By repainting an entire piece of a vehicle such as a fender, color variations between the new and existing finishes are less likely to be noticed because of the physical break in contiguity between the two finishes.

The difficulty in matching base coat paint colors of two coat finishes is compounded by the presence of a clear overcoat, which affects the color exhibited by the base coat. Base coat paints often dry to a matte or flat finish, and only appear lustrous upon application of a glossy clear coat. This glossy clear coat can also affect the apparent tint of the base coat. Until the luster has been imparted to a base coat, therefore, one cannot accurately determine whether the base coat is suitably tinted. To obtain an accurately tinted base coat paint, therefore, one often applies a test base coat paint, lets it dry, applies a clear coat, lets it dry, compares the new finish with the existing finish, and modifies the test base coat paint formulation and repeats the process as many times as necessary to perfect the tint. Body shops often apply test coats of base paint and clear coat to separate pieces of sheet metal for comparison purposes to avoid prematurely coating the vehicle with base coat paint or a glossy clear overcoat.

Body shops often use intermix systems to vary the ingredients or concentrations of ingredients in a base coat paint formulation to match more closely the color of an existing finish. Intermix systems typically contain large volumes of many tints of paint, and as a result are large and cumbersome. For example, the BASF Diamont intermix system contains sixty-eight (68) tints of paint, and thus sixty-eight (68) one gallon containers. Because of the space occupied by the paint containers, intermix systems generally are used only at body shops and other facilities that have sufficient space to accommodate the system.

Body shops also offer controlled environments in which large vehicle parts can be painted under controlled conditions. To promote even application, drying, and curing of paint, body shops typically contain specially designed paint booths having environmental controls to normalize, among other variables, the temperature, humidity, and circulation of air.

Body shops are, however, frequently inconvenient, because of the time required for repair at a body shop, and the need to transport the vehicle to the body shop. Because of this inconvenience, and the concomitant expense, mobile touch-up services have evolved. Mobile touch-up services often repair damaged areas using a small paint brush or other device. In one method of spot painting, the painter applies a dab of manufacturer supplied touch-up paint to the damaged area of the vehicle and attempts to produce a smooth finished surface. The touch-up paint often does not adequately match the existing finish of a vehicle, and frequently results in a finished surface with detectable differences between the tint of newly painted areas and the existing finish.

Mobile paint repair services have, accordingly, been perceived as inferior to body shops. Other factors have also contributed to this perception. For example, because mobile repair services typically operate outdoors, they do not offer a controlled environment that is conducive to repainting entire body parts. Moreover, mobile services have been unable to mix suitable paint formulations for spray painting damaged areas because of the size and immobility of intermix systems that are capable of producing suitably tinted paints. Mobile paint repair services also do not have available the time that is required to test a base coat paint formulation by applying a clear coat because, unlike body shops, mobile paint services cannot go to another job while a test clear coat dries.

SUMMARY OF THE INVENTION

The present invention relates to a process for preparing base coat paint formulations to repair damaged two layer paint finishes by spot painting. The process yields a repair quality that is equivalent to body shop quality, and which can be performed in substantially less time than body shop repairs. The process is especially suitable for mobile operations. In a suitable embodiment of the invention volumes of at least two color imparting components are first added to separate containers in proportions recommended by the manufacturer to match an existing base coat paint. Each of the components is then reduced by a base reducer, equal in weight to the component with which it is mixed. A portion of each of the components, between about one fourth and one half of the contents in each container, is then added to a third container and mixed to obtain a test base coat paint. A spot of the test base coat paint is sprayed directly onto the vehicle surface in the damaged area and allowed to dry, rather than being painted to a test piece of metal.

After the test base coat paint has dried a clear coat is simulated by spraying a solvent over the spot of paint. Before the glossy solvent evaporates the painter compares the tint of the finished test spot with the tint of the original vehicle finish. If the finishes do not adequately match, the tint of the test base coat paint is varied by adding a further portion of the appropriate component. The testing and process is then repeated until a suitable final base coat paint is obtained.

It is an object of this invention, therefore, to provide a method for blending and testing paints to obtain a paint formulation that matches an existing paint finish.

It is another object of this invention to provide a method for obtaining accurate base coat paint formulations to match the base coat paint in two coat paint finishes.

Another object of the invention is to provide a method of blending and reblending paint to obtain an accurate formulation.

Yet another object of the invention is to provide a method for simulating a two coat finish having a clear coat.

Still another object of the invention is to render mobile paint refinishing operations effective substitutes for stationary body shops.

A still further object of the invention is to enable effective spot painting and to avoid painting entire body parts.

Other objects, aspects and advantages of the invention are apparent from this specification, the claims, and the drawings.

DETAILED DESCRIPTION

Before a damaged paint finish is repainted it is first prepared by cleaning the damaged and contiguous areas of the finish using solvents that remove the waxes and other protective sealants from the clear coat. Commercially available products for such cleaning and sealant removal are readily available and include Polycracker®, which removes the sealant Polyglycoat®. Any scratches or dents are next treated to restore the damaged surface to the original or desired curvature, texture and appearance. Scratches can be filled with a filler material such as 2K® Lightweight Putty which can optionally be used in conjunction with 2K® Lightweight Putty Hardener. Both of these products are manufactured by Minnesota Mining and Manufacturing ("3M"). 2K® Lightweight Putty is a two-part polyester filler material that dries in as little as forty-five (45) seconds and is used in light coats to fill in scratches. Although 2K® Lightweight Putty is particularly effective in mobile operations because of its ease of use, speed of drying, and durability, any suitable filler material can be used. Considerations in choosing a filler material include the drying time and resiliency, durability, and cohesiveness of the material.

After the filler material has dried, it is feather sanded, along with the paint that adjoins the filler. A block covered with very fine sand paper is rubbed against the contiguous paint to gradually decrease the thickness of the paint as it nears the filled area. A sandpaper should be selected that will not create scratches deeper or wider than those that a paint can uniformly fill. A 400 or 600 grit abrasive paper is typically suitable. After feather sanding, the surface is checked for any small holes that may have become exposed by the sanding. Any such holes can be filled by a second application of a suitable filler, such as the filler material described above.

After the desired surface has been obtained and any pinholes repaired, the surface is covered with a primer. Paint manufacturers normally recommend primers to be used with their paint systems. However, because the manufacturers' recommendations typically optimize results when applied under the controlled conditions of a paint booth, recommended primers do not always achieve optimal results when applied in the uncontrolled environments that are typical for mobile repair services. A primer that performs well in uncontrolled environments when using BASF Diamont paints and other polyester or polyurethane based paints is a water borne acrylic hydrosol primer such as BASF HP-100, that comprises silica, talc, titanium dioxide, and propylene glycol monomethyl ester, and is low in VOC content. Important considerations when selecting a primer include drying time, compatibility with other chemicals used in the process, and compatibility with the physical conditions to which the primer is subjected. In colder weather, for example, the primer is often exposed to heat guns and infra-red quartz lights that are used to heat a vehicle body panel in order to speed the drying times of the filler, primer, base paint coat, and, clear coat, and the primer selected should be able to withstand these conditions.

After the primer has been applied the surface should be block sanded again. 400 or 600 grit abrasive paper is often suitable, although other grades of abrasive paper also work. After the surface is sanded it is ready for the application of a base coat paint. A suitable base coat paint must, however, first be formulated and mixed.

As discussed above, base coat paints mixed according to the manufacturer's formulation often do not duplicate the color of an existing base coat because the base coat changes color over time. The conventional method of developing an appropriate formulation, by engaging in a repetitive process of mixing, painting, applying clear coat, removing clear coat, remixing, and repainting, is often prohibitively inefficient, especially when not performed in a regulated spray booth.

In a suitable embodiment of the present method two color imparting components of a manufacturer's paint formulation, typically the metallic and pigment components, are first measured and added to separate containers. The amounts of metallic and pigment components used can vary, but should be proportionate to the amounts prescribed by the manufacturer's formulation. A base coat reducer, equal in weight to the metallic and pigment components in each container, is then added to each container to obtain reduced color imparting components. For example, if there are five grams (5 g) of pigment in one container, then five grams (5 g) of base coat reducer should be added to that container. Likewise, if there are five grams (5 g) of metallics in one container, then five grams (5 g) of reducer should be added to that container. Because accurate measurement of the color imparting components and base coat reducer are important, a sensitive scale should be used to measure the components and the reducer. A scale sensitive to 0.001% is particularly suitable. Numerous base coat reducers are commercially available and suitable for this process, and function over various temperature ranges. Suitable base coat reducers are often recommended by the manufacturer of the base coat paint. BASF UR-50, a universal acetate laquer reducing agent, is usually suitable, although UR-30 and UR-70 may be chosen depending on the temperature.

After weighing the color imparting components and mixing the color imparting components with the base coat reducer a portion, such as one fourth to one half, of each of the mixtures is added to a third paint cup to obtain a test base coat paint. If the existing finish that is being repaired is a light color, such as gold, silver, or a light blue tint, it is often appropriate to mix less of the pigment mixture, such as a fourth of the contents of the pigment container, with a greater portion of the metallics mixture, such as a half of the contents of the metallics container. When attempting to replicate darker color finishes, it is often appropriate to mix less of the metallics mixture, such as a fourth of the metallics container, with a greater portion of the pigment mixture, such as a half of the pigments container. Although there is no clear line of color darkness to determine whether to start with a greater portion of the pigments or metallics containers, a skilled vehicle painter is able to determine the best approach based upon the color and fade of the vehicle finish, and the painter's experience with similar finishes.

After mixing the reduced color imparting components a test area of the repaired area is sprayed with the test base coat paint and allowed to dry. High volume low pressure ("HVLP") systems are suitably used, and the system used is optimally capable of delivering ninety percent (90%) of the contents of the third paint cup with little overspray. After it has dried, the newly painted area is sprayed with a lustrous liquid to simulate a clear coat. Pre-cleaners or other lustrous solvent, which remains wet for roughly ten (10) seconds, impart to the painted surface a luster and look that replicates the luster and look that a clear coat would provide, and which evaporate and leave little residue, can be chosen as the lustrous liquid. BASF Pre-Kleano is a particularly suitable solvent for replicating the desired luster. As previously discussed, without this luster, it is difficult to ascertain whether the tint of the base paint is correct, and whether the new finish will ultimately match the existing finish after the clear coat is applied. The solvent thus allows the painter to evaluate the eventual color of a new finish using the test base coat paint without the costly and inefficient application of a clear overcoat. Moreover, because the solvent evaporates it leaves the surface substantially ready to receive another coat of test base coat paint. In contrast, if a clear coat is applied to the vehicle surface it must either be removed or allowed to dry on the surface of the vehicle before another test is done. After the solvent evaporates, the new finish may suitably be removed using another solvent, such as Limco 200 Select Single Stage Enamel Reducer, a naptha based solvent, to remove the test base coat paint.

If the color of the new finish, as modified by the simulated clear coat, does not adequately match the existing finish, then a portion of one of the reduced color imparting components is added to the test base coat paint to alter the tint thereof. The metallics component is typically added to the test base coat paint to lighten the tint, and the pigment cup is typically added to the test base coat paint to darken the tint. The process of test painting, applying solvent to simulate the clear coat, and wiping off the test paint is repeated until the match is satisfactory.

After a suitably tinted final base coat paint has been developed, a coat of the final base coat paint is applied to the surface by a conventional painting method, preferably a method using a HVLP apparatus. After this coat dries another layer of the final base coat paint is applied if the first coat is judged to be too thin. After the final base coat paint has been coated to a suitable thickness on the vehicle and allowed to dry, the edges of the coat are blended with the existing finish of the vehicle. Although there are many suitable blending techniques, one method is to mix, in a 1:1:1 weight ratio, the final base coat paint with a pigment-free base coat composition and a base coat reducer, to obtain a 1:1:1 mixture. The 1:1:1 mixture is then sprayed around the edges of the freshly applied paint. Although not necessary, the mixture can be sprayed completely over the freshly painted surface area, and can extend into the existing finish well beyond the edges of the freshly painted surface. Suitable pigment free base coat compositions and base coat reducers include BASF BC-100 and BASF UR-50, respectively. Mixing the final base coat paint with these agents weakens the paint solution, so that when this 1:1:1 mixture of paint is applied to the edges of the repainted area it causes the repainted area to more readily blend into the old paint. Although the 1:1:1 ratio works best, the range of components can vary from this ratio and still function effectively. Ratios ranging from 1:1:1 to 1:2:2 are, accordingly, suitable for practicing the invention.

If the freshly applied base coat paint and the existing finish do not adequately blend after the 1:1:1 mixture is sprayed around the edges of the freshly applied base paint, the 1:1:1 mixture can again be reduced, preferably at a 1:1:1 ratio, with the pigment free base coat composition and base coat reducer. This composition can again be applied to the edges of the freshly painted surface to enhance blending with the existing finish. If the finishes still do not adequately blend, the 1:1:1 mixture can be reduced a third time, again preferably at a 1:1:1 ratio, and applied to the edges.

After the freshly applied base coat paint has been blended with the existing finish, a new clear coat layer is applied over the freshly applied base coat. Particularly suitable clear coat compositions for use with polyester and polyurethane based base coat paints are urethane based clear coats, which include products such as BASF DC-76, DC 88, DC 89 and DC 92. These clear coat compositions are preferred because of their drying time, but other suitable fast-drying clear coats can also be used. A hardener can also be used to accelerate the drying time of the clear coat. Manufacturer recommended hardeners are often used, although such hardeners often do not have a sufficiently short drying time. A particularly suitable fast-drying hardener for use with polyurethane based clear coat compositions are diisocyanate based compositions, which include BASF 929-70 Glassodur Polar Hardener.

After the new clear coat has been applied, and before it has dried, its edges are blended with the existing clear coat finish by rubbing the edges with a blending agent. Solvents, such as AZCO Sikkens SRA Reducer or BASF HR-50, are particularly suitable blending agents. After the new clear coat has dried, the edges are further blended with the existing clear coat finish by wet sanding using a suitably fine paper, preferably in the range of 1000 to 1500 grit, and a solution of water and a liquid detergent, to reduce friction. If a rough texture exists in the surrounding area, wet sanding can be particularly helpful blending the newly painted area with the surrounding area.

After wet sanding the surface can be buffed with a suitable cutting cream or brilliant cleaner and glaze. Suitable products include synthetic cutting creme products, cleaner/glaze products, and reconditioning products manufactured or sold by Production Car Care Products, Car Brite, Inc., or Selig Chemical Industries.

The foregoing is provided for purposes of illustrating, explaining, and describing embodiments of the present invention. Modifications and adaptations to the embodiments will be apparent to those skilled in the art and may be made without departing from the scope and spirit of this invention.

What is claimed is:

1. A process for preparing paint comprising the steps of:

(a) providing a base coat reducer, (b) providing a first color imparting component, and mixing the base coat reducer with the first color imparting component to obtain a first reduced component;

(c) providing a second color imparting component and mixing the base coat reducer with the second color imparting component to obtain a second reduced component;

(d) mixing a portion of the first reduced component with a portion of the second reduced component to obtain a test base coat paint;

(e) testing the test base coat paint by a series of substeps comprising: (I) applying the test base coat paint onto a surface and allowing it to dry to obtain a painted surface; (II) temporarily simulating the appearance of a clear coat by applying to the painted surface a volatile lustrous liquid which remains wet for about ten seconds, provides a simulated clear coated painted surface and does not permanently modify the painted surface upon evaporation; and (III) comparing the color of the temporarily simulated clear coated painted surface with the color of an existing finish;

(f) if the simulated coated painted surface does not match the existing finish, adding a further portion of either the first reduced component or second reduced component to the test base coat paint to obtain a varied test base coat paint, and testing the varied test base coat paint as in step (e); and (g) repeating step (f) until the simulated coated painted surface matches the existing finish when tested as in step (e).

2. The method of claim 1 wherein the base coat reducer is an acetate based lacquer.

3. The method of claim 1 wherein the base coat reducer is mixed with the first and second color imparting components in amounts ranging from approximately 100% to 150% of the weights of the first and second color imparting components respectively.

4. The method of claim 1 wherein the base coat reducer is mixed with the first and second color imparting components in amounts substantially equal to the weights of the first and second color imparting components respectively.

5. The method of claim 3 wherein the first color imparting component is selected from the group consisting of metallics, micas and pearls and the second color imparting component comprises a solid pigment.

6. A method for repairing a painted surface by temporarily simulating the appearance of a clear coat of a two coat finish comprising the step of spraying a dried base coat with a volatile lustrous liquid which remains wet for about ten seconds, does not permanently mode the painted surface and then evaporates.

7. The method of claim 6 wherein the lustrous liquid is a solvent.

8. A method of blending the edges of a base coat finish that has been applied to a substrate with a contiguous paint finish already present on the substrate, wherein the base coat finish is obtained from a first base coat paint that contains pigment, comprising the steps of:

a. mixing a weight of the first base coat paint with a weight of a pigment free base coat paint composition and a weight of a base coat reducer to obtain a weight of a mixture; and b. spraying the mixture onto and around the edges of the base coat finish.

9. A method of blending the edges of a base coat finish that has been applied to a substrate with a contiguous paint finish already present on the substrate, wherein the base coat finish is obtained from a first base coat paint that contains pigment comprising the steps of:

a. mixing a portion of the first base coat paint with a portion of a pigment free base coat paint composition and a portion of a base coat reducer to obtain a mixture wherein the weight ratio of first base coat paint to pigment free base coat paint to base coat reducer in the mixture ranges from 1:1:1 to 1:2:2; and b. spraying the mixture onto and around the edges of the base coat finish.

10. The method of claim 9 wherein the weight ratio of first base coat paint to pigment free base coat paint to base coat reducer in the mixture is about 1:1:1.

* * * * *